United States Patent
Jensen

[11] Patent Number: 5,904,743
[45] Date of Patent: May 18, 1999

[54] DUST COLLECTOR BAG FASTENING APPARATUS

[76] Inventor: Robert Jensen, 922 N. Chalet Ave., Tucson, Ariz. 85748

[21] Appl. No.: 09/082,826

[22] Filed: May 21, 1998

[51] Int. Cl.$^6$ .................................................. B01D 46/02
[52] U.S. Cl. ..................... 55/341.1; 55/341.2; 55/341.3; 55/376; 55/378
[58] Field of Search ................................. 55/341.1, 341.2, 55/341.3, 341.5, 376, 378

[56] References Cited

U.S. PATENT DOCUMENTS

| | | | |
|---|---|---|---|
| 3,170,777 | 2/1965 | Held | 55/341.3 |
| 3,177,636 | 4/1965 | Jensen | 55/341.1 |
| 3,837,151 | 9/1974 | Jensen | 55/341.3 |
| 3,893,833 | 7/1975 | Ulvestad | 55/341.5 |
| 4,219,343 | 8/1980 | Peterson | 55/341.3 |
| 4,648,889 | 3/1987 | Jensen | 55/341.2 |
| 5,061,303 | 10/1991 | Williams et al. | 55/341.1 |
| 5,290,441 | 3/1994 | Griffin et al. | 55/376 |
| 5,746,792 | 5/1998 | Clements et al. | 55/378 |

*Primary Examiner*—Jay H. Woo
*Assistant Examiner*—Minh-Chau T. Pham

[57] ABSTRACT

An improved baghouse which is adapted to remove particulate matter from an air flow. The baghouse has three main chambers being the plenum, the receiving chamber, and a hopper. The three chambers are separated from each other using tubesheets having multiple holes therein. Filtering bags are connected to the upper and lower tubesheets. Attachment of the bag to the upper tubesheet is accomplished using a thimble that is preferably assembled with the bag and then delivered to the site ready for easy insertion into the hole of the tubesheet. A strap to sandwich the bag to the upper thimble. At the lower end, there are attached thimbles on the tubesheet and the bags are secured to those thimbles using clamps. Through the use of beads on the thimbles and bags, shaped clamps and straps, the bag is secured to both thimbles such that slippage and leakage are eliminated; further the shaped bottom clamps prevent relative motion between the bag and the top of the bottom thimble so that excess bag wear is avoided.

25 Claims, 2 Drawing Sheets

DUST COLLECTOR BAG FASTENING APPARATUS

BACKGROUND OF INVENTION

This invention relates generally to baghouses and more particularly to top inlet baghouses.

The types of bag fastenings vary depending on where they are made; from above or below the tubesheets. They also vary depending on the type of thimbles; some thimbles are slidable in the holes in the tubesheets and some are welded to the tubesheets.

One current method of securing a bag is to sew a flexible metal band in the bag cuff and to have it bear on an internal thimble bead as in FIG. 3 of U.S. Pat. No. 3,177,636. This approach requires very exacting manufacturing tolerances. The sewn-in snap band has to be a near-perfect fit to match the inside diameter of the upper thimble. Since the bag and thimble are usually manufactured by two different suppliers, there is a high level of quality control required and two sources of error. If one, or both diameters are not correct, the bag may not go in (too big) or it may slide off (too small) or, if it is not a snug fit, it may not be adequately air-tight for the service conditions.

Another type of deficiency relates to costs. A manufactured product that requires a minimum of quality control should cost less than one that requires a maximum of quality control. A design that minimizes field labor costs is preferable to one that does not.

The fastenings described in this disclosure require a minimum of quality control. Because shop labor is less costly than field labor the top fastening in this disclosure is made by the bag manufacturer. Bottom inlet bags are frequently supplied with disposable metal caps. Shop assembly is less costly than field assembly—the labor cost difference may pay for the cap. In addition, bad fits are found and corrected in the shop instead of at the job site.

Sewn-in snap bands are popular because they obviate the need for clamps and for the tools and labor to install the clamps in the field. Another way to avoid clamps, tools and field labor is to have the bag supplier also furnish the thimbles and to attach the bags to the thimbles in the manufacturing shop.

Another method which is utilized is to slide the cuff over an external thimble bead and to use a hose clamp in the space between the rope bead at the end of the bag cuff and the thimble bead.

Bags for existing top inlet baghouse dust collectors are fastened by a variety of means. Often, these fastenings suffer from one or more of the following faults:

1) labor and material for fastenings are too costly,
2) bottom fastening in some designs has to be from below the lower tubesheet—a dirty and hazardous job,
3) divided responsibility for quality control may cause defective fastenings.

There is a significant need for fastenings which do not suffer from any of these limitations.

SUMMARY OF THE INVENTION

The present invention creates a highly improved method of fastening top inlet dust collecting bags.

In this application, top inlet baghouses are generally described in U.S. Pat. No. 4,648,889, incorporated hereinto by reference.

In this invention, a baghouse is described which is adapted to remove particulate matter from an air flow. Such baghouses are used often to comply with environmental regulations or concerns.

The baghouse of this invention has three main chambers being the inlet plenum, the receiving chamber, and a hopper. The three chambers are separated from each other using tubesheets having multiples holes therein.

A particulate laden air flow enters the inlet plenum and is directed into the bags. Filtering bags are connected to the upper and lower tubesheets. The air flow travels through the bag material which collects the particulate. During reverse flow of clean gas, the filter cake of particulate falls into the hopper. Periodically the hopper is emptied.

During the cleaning process, a sufficient amount of reverse pressure is imposed on the receiving chamber which collapses the bases and releases the filter cake.

Attachment of the bag to the upper tubesheet is accomplished using a thimble that is preferably attached to the bag and delivered to the site ready for insertion into the hole of the tubesheet. Since the bag/thimble combination is manufactured at a plant, and not assembled at the baghouse site, the costs and time required for installation are significantly reduced as are the probabilities for misfits.

For the upper thimble, a strap sandwiches the bag to the thimble. The upper thimble has a collar around which the strap is secured. An upper bag cuff constructed using two or more layers of the bag material provides a durable surface upon which the strap sandwiches the bag.

When the thimble/bag is placed in a hole in the upper tubesheet, the preferred embodiment uses a gasket of suitable material which is secured between a lip or shoulder of the thimble and the tubesheet. As the thimble is pulled downward, the gasket forms a seal.

In some embodiments, the gasket also extends through the hole to protect the bag during installation from being damaged by any roughness of the holes in the tubesheet.

At the lower end, an attached thimble is welded or otherwise secured to the tubesheet. The open lower end of the filter bag is slipped over the thimble and then secured in place using clamps.

As with the upper thimble, a bead or shoulder is provided around the upper edge of the lower thimble and one clamp is positioned to cradle or engage this bead.

A second identical clamp is ideally used in the inverted position to engage a rope bead at the bottom of the filter bag. In this manner, two identical clamps are used; the two together provide a very secure clamping mechanism which properly secures the bag to the thimble.

Note, the upper-most clamp used on the lower thimble, by engaging the bead, prevents particulate matter from collecting between the thimble and the filter bag. This reduces a major cause of bag failure due to abrasion.

Through the use of beads on the bags and lower thimbles and shaped clamps, the bags are secured to the lower thimbles so that slippage is eliminated.

The invention, together with various embodiments thereof, will be more fully explained by the accompanying drawings and following description.

DRAWINGS IN BRIEF

DRAWINGS IN DETAIL

Figure 1:
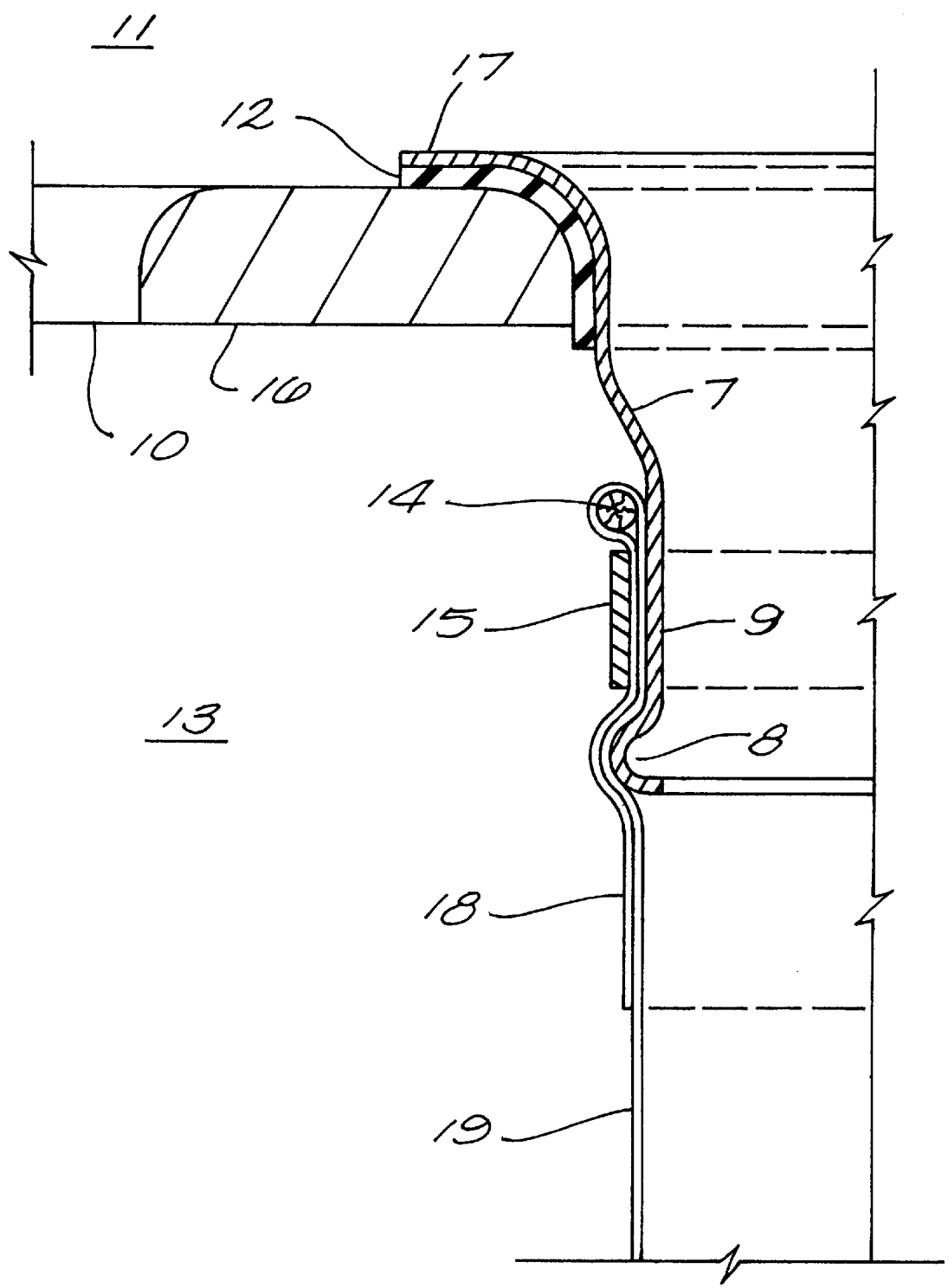
FIG. 1 is a partial side view of an upper thimble, filter bag and upper tubesheet.

FIG. 1 is a partial side view of an upper thimble, filter bag and upper tubesheet.

Particulate laden air flows into plenum 11 then through thimble 7 to enter bag 19. Bag 19 allows a flow of air to pass therethrough into the receiving chamber 13 while collecting the particulates which are periodically dislodged by reverse clean air flow and fall into the underlying hopper (not shown).

Thimble 7 has two major portions: the flange or shoulder 17 which supports thimble 7; and the collar 9 which is used to secure the bag 19. A bead 8 around the lower portion of collar 9 is used to fully secure bag 19 to thimble 7.

As shown in this figure, bag 19 has a cuff 18 positioned on the upper portion to provide a better seal and more durability. Cuff 18 is created by multiple layers of bag 19.

Further, rope bead 14 is contained within cuff 18. Rope bead 14 is used to fully secure bag 19 to thimble 7.

In the preferred embodiment of the invention for fastening the top of a bag, attachment of bag 19 to thimble 7 is by using strap 15. In one embodiment of the invention, strap 15 is secured using a crimping tool (not shown) to lock the two ends of the strap together, similar to the apparatus used to fasten tops to drums. Other means using different strapping materials and different locking tools are obvious to those of ordinary skill in the art.

Ideally, the assembly of bag 19 and thimble 7 is manufactured and is slipped into place at the baghouse site.

For a typical bottom inlet or top inlet baghouse using nominal 12" diameter bags (such as woven fiberglass), holes within the upper tubesheet 10 use a bag spacing which is usually 14" centerline to centerline of the bags in both directions.

Ligament 16 between the holes in the tubesheet are thus approximately 2" wide for 12" diameter holes for bottom inlet bags and for both tubesheets for top inlet bags.

In order to install the top inlet bag assemblies (thimble 7/bag 19/and strap 15) from the upper plenum 11, holes in the upper tubesheet 10 have to be large enough to pass the overall width of the assembly. If a hose clamp is used instead of strap 15, a larger hole in upper tubesheet 11 is required.

It is preferred that thimble 7 and strap 15 are made of the same material; mild steel is the preferred embodiment.

In this embodiment, both the strap 15 and thimble 7 are made of mild steel and both together with the bag are disposable. In this manner, both thimble 7 and strap 15 have the same coefficient of thermal expansion. If the coefficients of thermal expansion are not the same, the difference should be as small as possible; ideally, thimble 7 should expand faster than strap 15.

In the preferred embodiment, the holes in the upper tubesheet 10 are not "dressed" to a rounded-off edge. The holes are usually flame cut by automatic machines which leave a rough edge.

If the bag assembly is to lowered through these holes, the rough edge should be smoothed to minimize the potential for damage to the bag.

In the preferred embodiment, an "L" shaped gasket 12, is used to obviate or reduce the cost of dressing the holes. Gasket 12 is positioned before lowering the bag assembly through gasket 12. In this manner, only the top edge of the holes should be smoothed and rounded to avoid damage to the gasket.

The vertical leg of the gasket makes it possible to use materials with different thermal expansions to improve the seal. If the metal of the upper tubesheet 10 and the thimble 7 have the same coefficient of thermal expansion and if gasket 12 has a faster coefficient, a temperature increase causes compression of gasket 12 and thus improves the seal. The same is accomplished by using a thimble 7 with a faster coefficient than the upper tubesheet 10 and/or by having faster coefficients for both the gasket 12 and the thimble 7.

In the preferred embodiment, the bag 19/thimble assembly is manufactured off-site and then installed as a completed unit. In this manner, the baghouse is able to be designed with very small tolerances and very high quality control. The vertical leg of gasket 12, of a compressible material, helps to compensate for small discrepancies in the diameters of the holes and thimbles.

Figure 2:
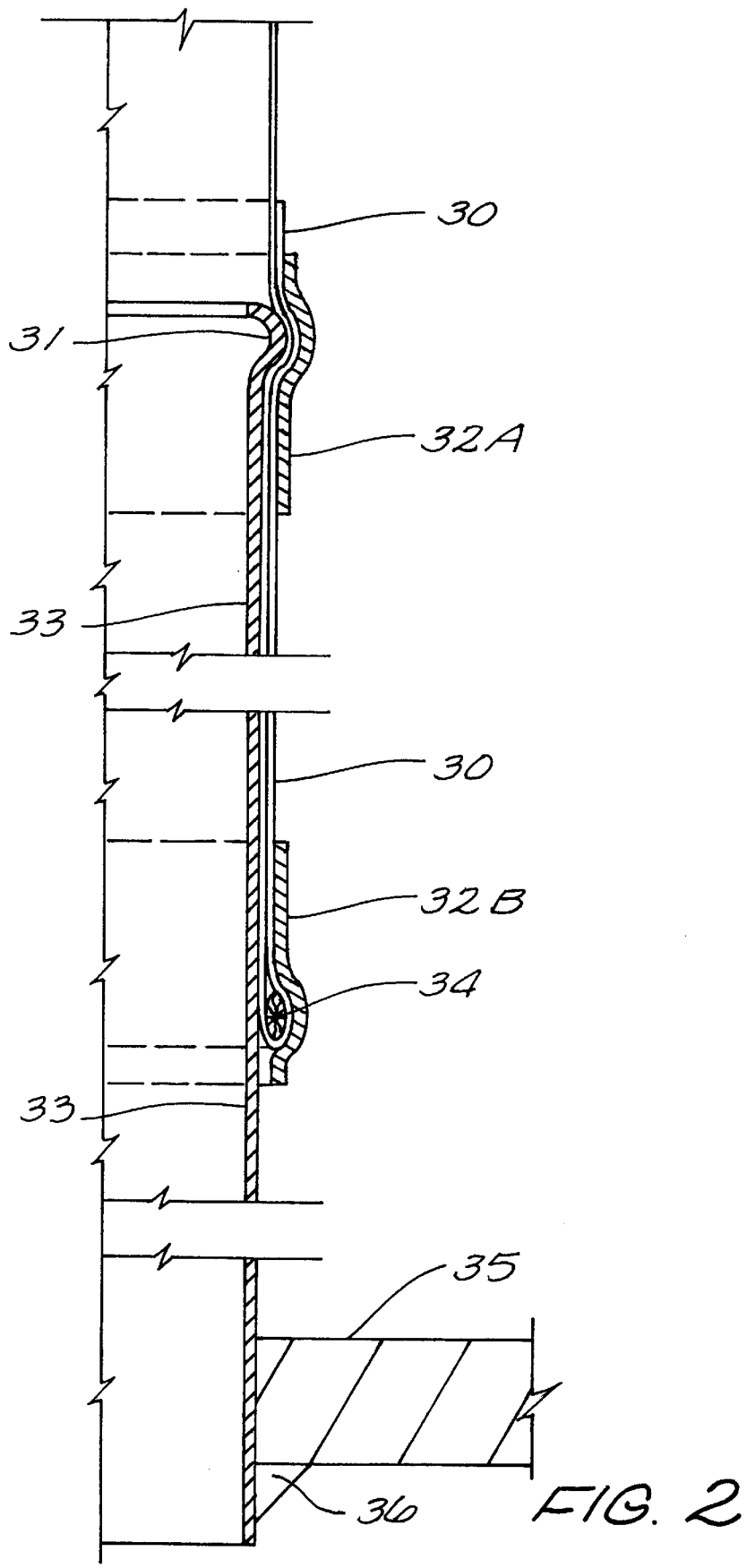
FIG. 2 shows a partial side view of the clamping combination used to secure the filter bag to a thimble on the lower tubesheet.

FIG. 2 shows a partial side view of the preferred clamping combination used to secure the filter bag to a thimble on the lower tubesheet 35.

In this embodiment, bottom thimble 33 is secured by weld 36 to the lower tubesheet 35. Bottom thimble 33 extends upward substantially straight with its upper edge formed as bead 31.

In the case of the bottom inlet scenario, the bags are attached to the thimble at the bottom of the bag. The closed top of the bag is free to move and is tensioned by various means at the top of the bags.

Before clamping the bottom of the bag to the bottom thimble, the bag is tensioned by hanging temporary weights at the bottom of the bag as described in U.S. Pat. No. 4,648,889.

Attachment of the bag to the thimble 33 is accomplished using two clamps 32A and 32B. In the preferred embodiment, clamps 32A and 32B are identical in shape and are merely inverted relative to each other.

Clamp 32A serves one set of functions at the top of the bottom thimble 33 by sandwiching bag cuff 30 with thimble 33 and engaging thimble bead 31. Clamp 32B also sandwiches bag cuff 30 and engages rope bead 34.

In this manner, clamp 32A and clamp 32B provide for excellent connection between thimble 33 and bag cuff 30. Further clamp 32A, by engaging thimble bead 31, prevents particulate from collecting at the interface between thimble 33 and bag cuff 30. Collection of particulate at this interface accelerates the failure of the bag.

Clamps 32A and 32B have a gap which makes it possible to open the clamp in order to pass over the bead at the top of the bottom thimble 33. The clamps are tightened in several ways obvious to those of ordinary skill in the art including, but not limited to: a threaded attachment mechanism similar to those encountered for hose clamps; trunk latch clamps are also suitable for this purpose and are preferred Note that clamps 32A and 32B, in the preferred embodiment are identical, and have a curved edge that serves one purpose in one position (engaging bead 31 of thimble 33) and a different purpose when inverted (engaging rope bead 34 of the bag cuff 30). In both positions, when latched, both clamps 32A and 32B provide the required seal and also prevent movement of the bag cuff 30 relative to thimble 33.

When both top inlet and bottom inlet bags are on line and inflated the bottom of the bag moves away from the bottom thimble bead and leaves a space between the bag and the thimble around the top of the thimble. This space accumulates particulate.

During reverse flow cleaning the bags move back to the thimble and compress the dust in that pocket. This movement is repeated each time the bags are cleaned. The bottom of the bag is thus subject to some amount of abrasion and is considered to be one cause for bag failure. When the clamp of this invention is in the top clamp position as shown in FIG. 2 the curved top of the clamp serves to prevent the inflated bag from moving away from the bottom thimble 33 thus preventing a means for bag failure.

The top clamp of FIG. 2 cannot be considered adequate to prevent the bag from moving upward. The bottom clamp, FIG. 2, in combination with the rope bead is adequate to prevent the bag from moving upward. The two clamps supplement each other with respect to preventing the bag from moving relative to the thimble and in providing an adequate seal.

The particulate collected by the bag is removed periodically by shutting off the supply of dirty air and by passing clean gas through the bag material in the reverse direction, thus dislodging the particulate which then falls to the hopper.

It is clear from the foregoing that the present invention creates a highly improved baghouse and filtering bag assembly for use therein.

What is claimed is:

1. A top inlet baghouse comprising:
   a) a plenum chamber receiving a flow of particulate laden gas:
   b) a receiving chamber;
   c) a horizontal upper tubesheet interposed between said plenum chamber and said receiving chamber, said upper tubesheet having a plurality of holes therein; and,
   d) a plurality of vertically suspended cylindrical bags, each of said cylindrical bags positioned in one of said holes in said upper tubesheet, a top of each cylindrical bags having,
      1) a substantially rigid thimble having a horizontal shoulder adapted to rest on said upper tubesheet and a collar, said collar having an external bead at a bottom lip thereof,
      2) a filter bag having a bag material filtering an air-flow, said filter bag further having a top cuff substantially thicker than said bag material, and,
      3) a bonding strap extending around said collar and sandwiching said filter bag proximate to said top cuff between said substantially rigid thimble and said bonding strap.

2. The top inlet baghouse according to claim 1, wherein said bonding strap has a coefficient of expansion less than or equal to a coefficient of expansion of said collar.

3. The top inlet baghouse according to claim 2, wherein a diameter of an assembly of said substantially rigid collar, said filter bag, and said bonding strap, is less than a diameter of the hole in said upper tubesheet.

4. The top inlet baghouse according to claim 2, wherein said top cuff of said filter bag includes at least two layers of the bag material of said filter bag.

5. The top inlet baghouse according to claim 2, wherein said top cuff of said filter bag includes a rope encased within a top edge of said cuff.

6. The top inlet baghouse according to claim 2, further including a gasket,
   a) substantially sealing the horizontal shoulder of said thimble with said upper tubesheet; and,
   b) allowing passage of the vertically suspended bag through said hole in said upper tubesheet.

7. The top inlet baghouse according to claim 6, wherein said gasket further includes a lip portion extending through said hole.

8. The top inlet baghouse according to claim 1,
   a) wherein each of said cylindrical bags has a lower bag cuff and a rope bead at a lower end thereof;
   b) further including a hopper located below said receiving chamber;
   c) further including a horizontal lower tubesheet interposed between said receiving chamber and said hopper, said lower tubesheet having a plurality of holes aligned with the holes in said upper tubesheet, each of the holes of said lower tubesheet having an attached thimble having,
      1) an external bead on a top edge thereof,
      2) a first lower clamp having an upper edge aligned with said external bead of the attached thimble, said first lower clamp sandwiching said lower bag cuff against said attached thimble.

9. The top inlet baghouse according to claim 8, wherein said first lower clamp includes having a curved upper edge engaging said external bead at the top lip of said attached thimble.

10. The top inlet baghouse according to claim 9, further including a second lower clamp sandwiching said cylindrical bag against said attached thimble.

11. The top inlet baghouse according to claim 10, wherein said second lower clamp includes a curved lower edge engaging said rope bead.

12. The top inlet baghouse according to claim 11, wherein said second lower clamp is identical to said first lower clamp.

13. The top inlet baghouse according to claim 10, wherein a coefficient of expansion of said first lower clamp is less than or equal to a coefficient of expansion of said attached thimble.

14. A top inlet baghouse comprising:
   a) a plenum chamber receiving a flow of particulate laden gas:
   b) a receiving chamber;
   c) a horizontal upper tubesheet interposed between said plenum chamber and said receiving chamber, said upper tubesheet having a plurality of holes therein;
   d) a hopper located below said receiving chamber;
   e) a horizontal lower tubesheet interposed between said receiving chamber and said hopper, said lower tubesheet having a plurality of holes, each hole in said lower tube sheet being aligned with one of the holes in said upper tubesheet, each of the holes of said lower tubesheet having an attached thimble having an external bead on a top edge thereof;
   f) a number of cylindrical bags communicating between the upper tubesheet and the lower tubesheet, each of said cylindrical bags having a lower bag cuff and a rope bead at a lower end thereof; and,
   g) a lower clamp having an upper edge aligned with said external bead of the attached thimble, said lower clamp sandwiching said lower bag cuff against said attached thimble.

15. The top inlet baghouse according to claim 14, wherein each of said cylindrical bags includes:
   a) a substantially rigid thimble having a horizontal shoulder resting on said upper tubesheet and a collar, said collar having an external bead at a bottom lip thereof; and,
   b) a bonding strap extending around said collar and sandwiching said filter bag proximate to a top edge thereof.

16. The top inlet baghouse according to claim 15, wherein said bonding strap has a coefficient of expansion less than or equal to a coefficient of expansion of said collar.

17. The top inlet baghouse according to claim 16, wherein said filter bag further includes a top cuff created by at least two layers of said filter bag.

18. The top inlet baghouse according to claim 14, wherein said lower clamp includes having a curved upper edge engaging said external bead at the top lip of said attached thimble.

19. The top inlet baghouse according to claim 18, wherein a coefficient of expansion of said lower clamp is less than or equal to a coefficient of expansion of said attached thimble.

20. A baghouse comprising:
   a) a plenum chamber receiving a flow of particulate laden gas:
   b) a receiving chamber;
   c) a horizontal upper tubesheet interposed between said plenum chamber and said receiving chamber, said upper tubesheet having a plurality of holes therein;
   d) a hopper located below said receiving chamber;
   e) a horizontal lower tubesheet interposed between said receiving chamber and said hopper, said lower tubesheet having a plurality of holes, each of the holes of said lower tubesheet having an attached thimble having,
      1) an external bead on a top edge thereof,
      2) a lower clamp having an upper edge aligned with said external bead of the attached thimble;
   f) a plurality of vertically suspended cylindrical bags, each of said cylindrical bags adapted to filter airflow passing through a material of said cylindrical bag, each of said cylindrical bags extending from a hole in said upper tubesheet to a hole in said lower tubesheet, a top of each of said cylindrical bags having,
      1) a substantially rigid thimble having a horizontal shoulder resting on said upper tubesheet and a collar, said collar having an external bead at a bottom lip thereof,
      2) a top cuff substantially thicker than said material of said cylindrical bag, and,
      3) a bonding strap extending around said collar and sandwiching said top cuff between said substantially rigid thimble and said bonding strap; and,
   g) a lower clamp encircling said attached thimble and sandwiching a lower portion of the cylindrical bag against said attached thimble.

21. The baghouse according to claim 20, wherein said top cuff of said filter bag includes a rope encased within a top edge of said top cuff.

22. The baghouse according to claim 20, further including a gasket, said gasket:
   a) substantially sealing the horizontal shoulder of said thimble with said upper tubesheet; and,
   b) allowing passage of the vertically suspended bag through said hole in said upper tubesheet.

23. The baghouse according to claim 22, wherein said gasket further includes a lip portion extending through said hole.

24. The baghouse according to claim 20, wherein said lower clamp includes having a curved upper edge engaging said external bead of said attached thimble.

25. The baghouse according to claim 24,
   a) wherein a lower edge of each of said cylindrical bags includes a rope bead therein; and,
   b) further including a second lower clamp sandwiching said cylindrical bag against said attached thimble, said second lower clamp includes a curved lower edge engaging said rope bead.

* * * * *